(12) United States Patent
Yoon et al.

(10) Patent No.: US 11,685,513 B2
(45) Date of Patent: Jun. 27, 2023

(54) PROPELLER APPARATUS OF AIR MOBILITY

(71) Applicants: Hyundai Motor Company, Seoul (KR); Kia Corporation, Seoul (KR)

(72) Inventors: Jay Young Yoon, Gyeonggii-do (KR); Youn Sic Nam, Daejeon (KR); Keon Woo Kim, Gyeonggi-do (KR); Kwan Ho Moh, Gyeonggi-do (KR); Yun Bae Chun, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/512,772

(22) Filed: Oct. 28, 2021

(65) Prior Publication Data

US 2022/0340259 A1 Oct. 27, 2022

(30) Foreign Application Priority Data

Apr. 26, 2021 (KR) .......................... 10-2021-0053679

(51) Int. Cl.
*B64C 11/28* (2006.01)

(52) U.S. Cl.
CPC .................................... *B64C 11/28* (2013.01)

(58) Field of Classification Search
CPC  B64C 27/50; B64C 11/28; B64C 3/56; B64C 9/34
See application file for complete search history.

(56) References Cited

U.S. PATENT DOCUMENTS

| 2,198,475 A | * | 4/1940 | Dorner | B64C 11/28 244/65 |
| 9,156,545 B1 | * | 10/2015 | Fenny | B64C 29/0033 |
| 2021/0107620 A1 | * | 4/2021 | Weekes | B64C 29/0025 |
| 2022/0144429 A1 | * | 5/2022 | Warner, IV | G06T 7/70 |

FOREIGN PATENT DOCUMENTS

| CN | 111252237 A | 6/2020 |
| KR | 102155796 B1 | 9/2020 |
| KR | 20200104582 A | 9/2020 |

* cited by examiner

*Primary Examiner* — Courtney D Heinle
*Assistant Examiner* — Andrew Thanh Bui
(74) *Attorney, Agent, or Firm* — Fox Rothschild LLP

(57) ABSTRACT

A propeller apparatus of an air mobility includes a housing having an inner space, where multiple slits are formed along a circumferential surface of the housing to extend in a vertical direction; a driving unit having connection portions formed to match respective ones of the slits in the housing; multiple link units configured to match the respective ones of the slits in the housing, where the link units are rotatably connected to the connection portions, respectively, of the driving unit; and multiple wing units configured to be rotated in a manner of being linked with the link units, which rotate when the driving unit moves up and down, thereby being folded to or deployed from the housing. The propeller apparatus is configured to prevent an accident due to scattering of a propeller when the air mobility falls, and to improve space utilization during storage of the air mobility.

7 Claims, 4 Drawing Sheets

PROPELLER APPARATUS OF AIR MOBILITY

CROSS REFERENCE TO RELATED APPLICATION

The present application claims under 35 U.S.C. § 119(a) the benefit of Korean Patent Application No. 10-2021-0053679, filed Apr. 26, 2021, the entire contents of which are incorporated by reference herein.

BACKGROUND

1. Technical Field

The present disclosure relates to a propeller apparatus of an air mobility that can prevent injury and/or property damage due to scattering of a propeller when the air mobility falls and which can improve space utilization during storage of the air mobility.

2. Description of the Related Art

Recently, air mobility vehicles (or "air mobilities") that can be used in various fields such as cargo container transportation and medical transportation are under development, and energy efficiency and stabilization techniques of air mobilities have been developed and are approaching the stage of commercial use.

Such air mobilities fly through the maneuvering of propellers, and stability to cope with a fall situation is essential in these air mobilities. Accordingly, in such air mobilities, the propellers are selectively controlled to respond to a fall situation, but there is no safety measure for the situation in which the air mobilities finally fall.

For example, when an air mobility falls, each rotating propeller hits the ground. Since rapidly rotating propellers hit the ground, fragments may be generated, and the fragments may scatter around the surroundings, causing a secondary accident.

The matters described above as the background art are provided only for promoting the understanding of the background of the present disclosure, and the foregoing description of the background art should not be construed as admitting that the matters described above correspond to the prior art already known to those skilled in the art.

SUMMARY

The present disclosure provides a propeller apparatus of an air mobility that can prevent occurrence of a secondary accident due to scattering of propellers when the air mobility falls, and that improves space utilization when storing the air mobility.

In view of the foregoing, a propeller apparatus of an air mobility according to the present disclosure includes: a housing having an inner space, wherein multiple slits are formed along a circumferential surface of the housing to extend in a vertical direction; a driving unit provided to move in the vertical direction in the inner space of the housing and having connection portions formed to match respective ones of the slits in the housing; multiple link units provided outside the housing and configured to match respective ones of the slits in the housing, wherein the link units are rotatably connected to the connection portions, respectively, of the driving unit; and multiple wing units rotatably installed to the housing, connected to the link units, respectively, and configured to be rotated in a manner of being linked with the link units, which rotate when the driving unit moves up and down, thereby being folded to or deployed from the housing.

The driving unit includes an actuator configured to generate power, and a driving rod configured to move up and down by receiving the power from the actuator, wherein the driving rod extends such that multiple connection portions provided along the circumference thereof match respective slits in the housing.

Each of the link units may include multiple rotatably connected link parts, and each of the wing units may include multiple wing parts to which respective link parts are rotatably connected and which are rotatably connected to each other.

Each of the wing units includes a first wing part having one end rotatably connected to the housing, and a second wing part rotatably connected to the other end of the first wing part. The first wing part and the second wing part are rotatably connected to respective link parts of one of the link units.

Each of the link units includes a first link part having one end rotatably connected to one of the connection portions and the other end slidably and rotatably connected to the first wing part, and a second link part having one end rotatably connected to the other end of the first link part and the other end rotatably connected to the second wing part.

The first wing part includes a guide slot formed in a linear shape along a longitudinal direction thereof, and the first link part includes a guide portion formed at the other end thereof to be connected to the guide slot.

The second wing part includes a hinge connection portion protruding from one end thereof to be connected to the other end of the second link part, and the hinge connection portion is formed to match the guide slot and is inserted into the guide slot when the wing units are deployed.

The first link part and the second link part are formed to match the guide slot and are inserted into the guide slot when the wing units are deployed.

Multiple recessed reception grooves are formed in the circumferential surface of the housing to match respective wing units, and a slit is formed in each of the reception grooves.

The driving unit is configured to operate such that the wing units are folded when a signal is input thereto according to fall of the air mobility.

With the propeller apparatus of the air mobility configured as described above, it is possible to prevent an accident due to scattering of fragments of the propeller when the air mobility falls and to improve space utilization when the air mobility is stored.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a propeller apparatus of an air mobility according to an embodiment of the present disclosure will be described with reference to the accompanying drawings.

Figure 1:
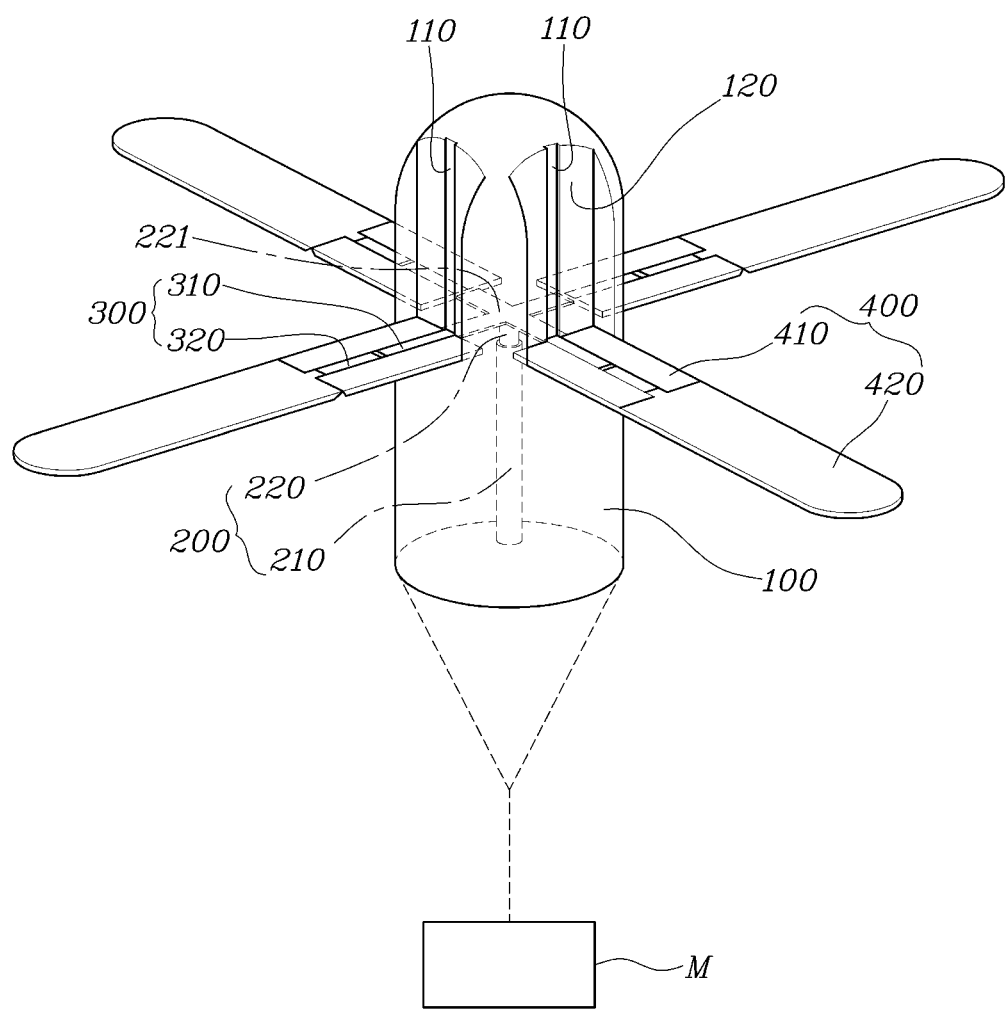
FIG. 1 is a view illustrating a propeller apparatus of an air mobility according to the present disclosure.
Figure 2:
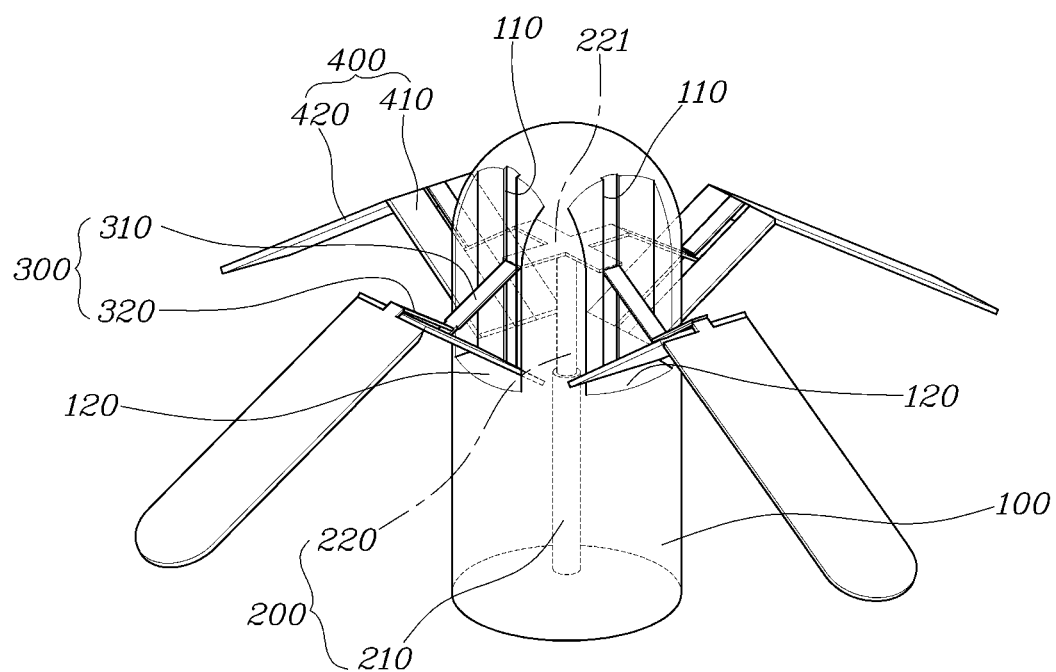
FIG. 2 is a view illustrating a process of folding the propeller apparatus of the air mobility according to the present disclosure.
Figure 3:
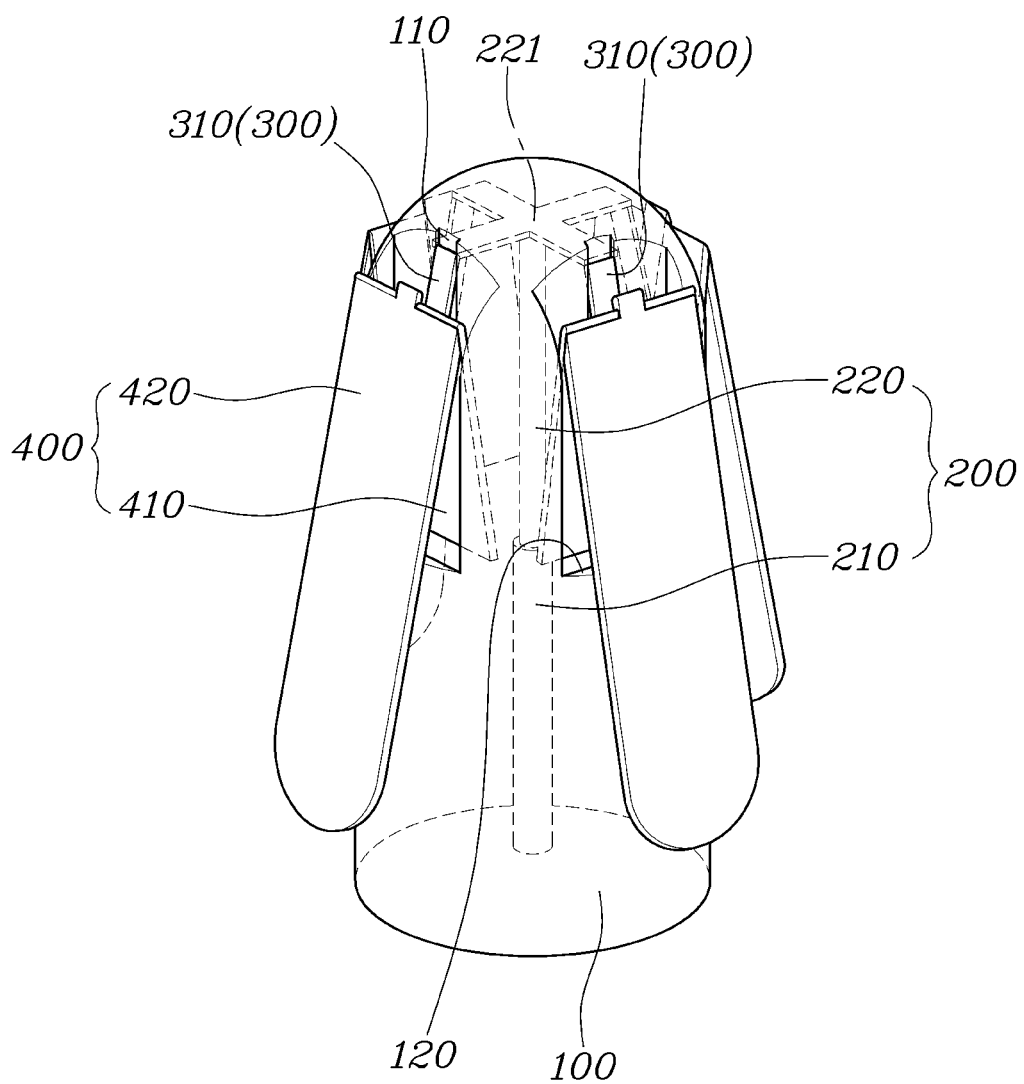
FIG. 3 is a view illustrating the propeller apparatus of the air mobility according to the present disclosure in the folded state.
Figure 4:
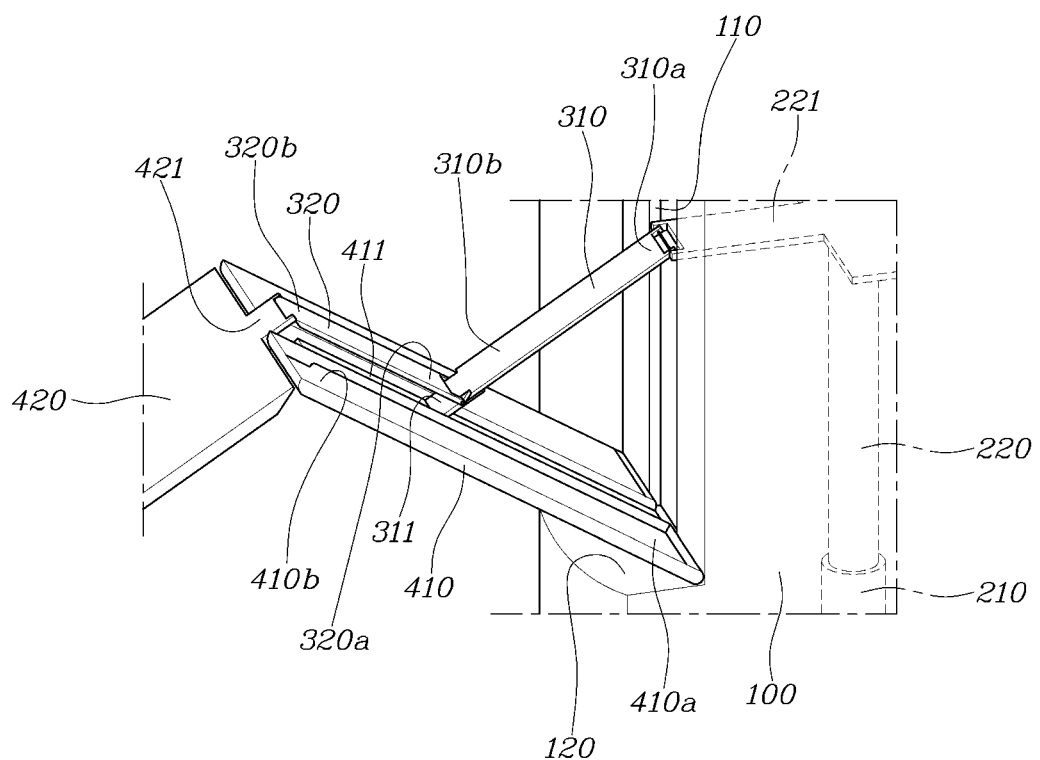
FIG. 4 is a view illustrating a link unit and a wing unit according to the present disclosure.

FIG. 1 is a view illustrating a propeller apparatus of an air mobility according to the present disclosure, FIG. 2 is a view illustrating a process of folding the propeller apparatus of the air mobility according to the present disclosure, FIG. 3 is a view illustrating the propeller apparatus of the air mobility according to the present disclosure in the folded state, and FIG. 4 is a view illustrating a link unit and a wing unit according to the present disclosure.

As illustrated in FIGS. 1 to 3, a propeller device of an air mobility according to the present disclosure includes: a housing 100 having an inner space, where multiple slits 110 are formed along a circumferential surface of the housing 100 to extend in a vertical direction; a driving unit 200 provided to move in the vertical direction in the inner space of the housing 100 and having connection portions 221 formed to match respective slits 110; multiple link units 300 provided outside the housing 100 and configured to match respective slits 110, where the link units 300 are rotatably connected to respective connection portions 221 of the driving unit 200; and multiple wing units 400 rotatably installed to the housing 100, connected to respective link units 300, and configured to be rotated in a manner of being linked with respective link units 300 which rotate when the driving unit 200 moves up and down, thereby being folded to or deployed from the housing 100.

Here, a driving motor M is mounted in the housing 100, and when the driving motor M is rotated, the wing units 400 are capable of generating thrust by being rotated in the state in which the wing units 400 are deployed. The driving unit 200 is installed in the housing 100, and the multiple slits 110 are formed along the circumferential surface of the housing 100. That is, in the housing 100, as many the slits 110 are formed as the number of wing units 400 constituting the propeller, and the driving unit 200 is installed in the inner space to rotate together with the housing 100.

The driving unit 200 is provided to move in the vertical direction in the inner space of the housing 100 and is provided with the connection portions 221 matching respective slits 110. When the driving unit 200 is driven, the link units 300 and the wing units 400 are operated in a manner of being linked with each other so that the wing units 400 are folded or deployed.

Accordingly, the driving unit 200 includes an actuator 210 configured to generate power, and a driving rod 220 configured to move up and down by receiving the power from the actuator 210, wherein the driving rod 220 extends such the multiple connection portions 221 provided along the circumference thereof match respective slits 110. That is, the actuator 210 is installed in the housing 100, and when the actuator 210 is operated, the driving rod 220 moves up and down while being pulled out from or drawn into the actuator 210 in the vertical direction. Here, along the circumference of the driving rod 220, the multiple connection portions 221 extend so as to match respective slits 110. Accordingly, when the actuator 210 operates, the driving rod 220 moves in the vertical direction, whereby the link units 300 connected to respective connection portions 221 of the driving rod 220 can be rotated in the manner of being linked with the movement of the driving rod 220, thereby rotating the wing units 400.

That is, when the driving unit 200 moves in the vertical direction in the inside of the housing 100, the link units 300 connected via the connection portions 221 of the driving unit 200 rotate in the vertical direction outside the housing 100. Thus, the wing units 400 connected to respective link units 300 are rotated in the vertical direction in the manner of being linked with the link units 300. As a result, the wing units 400 may be folded to or deployed from the housing 100. That is, the wing units 400 may be folded to the housing 100 when the air mobility is being stored or when the air mobility is falling, and during normal operation, the wing units 400 maintain the deployed state and are rotated together with the housing 100, thereby generating thrust.

The link units 300 and the wing unit 400 of the present disclosure provided for this purpose will be described in detail below.

Each of the link units 300 may include multiple rotatably connected link parts, and each of the wing units 400 may include multiple wing parts to which respective link parts are rotatably connected and which are rotatably connected to each other.

In this way, since each wing unit 400 includes multiple wing parts, and is rotatably connected via the multiple link parts, it is possible to further reduce the space occupied by the wing parts in the folded state because each of the wing parts is folded when the wing units 400 are folded.

Specifically, as illustrated in FIG. 4, each wing unit 400 includes a first wing part 410 having one end 410a rotatably connected to the housing 100 and a second wing part 420 rotatably connected to the other end 410b of the first wing part 410, and the first wing part 410 and the second wing part 420 are rotatably connected to respective link parts of a corresponding link unit 300.

Here, the link units 300 includes a first link part 310 having one end 310a rotatably connected to a corresponding connection portion 221 and the other end 310b slidably and rotatably connected to the first wing part 410, and a second link part 320 having one end 320a rotatably connected to the other end 310b of the first link part 310 and the other end 320b rotatably connected to the second wing part 420.

The first wing part 410, the second wing part 420, the first link part 310, and the second link part 320 are each formed in a hinge connection structure and are rotatably connected to each other. Through this, while the driving unit 200 moves up and down and thus the first link unit 310 connected to the driving unit 200 moves up and down following the driving unit 200, the second link part 320, the first wing part 410, and the second wing part 420 are interlocked and rotated, whereby the first wing part 410 and the second wing part 420 are folded or unfolded to be deployed.

Here, a guide slot 411 may be formed in a linear shape along the longitudinal direction in the first wing part 410, and a guide portion 311 connected to the guide slot 411 may be formed at the other end 310b of the first link part 310. That is, in the first wing part 410, the guide slot 411 may extend in a linear shape, and the guide portion 311 formed at the other end of the first link part 310 may be inserted into the guide slot 411 so as to be movable along the guide slot 411. The guide slot 411 may be formed to be recessed in the first wing part 410, and grooves may extend in the length direction at opposite sides of the recessed portion. In addition, the guide portion 311 may be formed in the first link part 310 to be inserted into the guide slot 411 and may have pins formed at opposite sides thereof so as to be inserted into respective grooves of the guide slot 411. Accordingly, the other end 310b of the first link part 310 may slide along the guide slot 411 in the first wing part 410 via the guide portion 311 and may rotate around the pins.

Accordingly, in the present disclosure, the one end 310a of the first link part 310 is hingedly connected to the corresponding connection portion 221 of the driving unit 200, and the one end 410a of the first wing part 410 is hingedly connected to the housing 100. Here, the other end 310b of the first link part 310 is slidably and rotatably connected to the first wing unit 410. Accordingly, when the driving unit 200 moves up and down, the one end 310a of the first link part 310 is moved in the vertical direction, and rotates the first wing part 410 while being slid in the first wing part 410, the one end 410 of which is rotatably connected to the housing 100. At the same time, the second link part 320 is interlocked with the rotation of the first link part 310 so that the angle between the second link part 320 and the first link part 310 is changed, and the second wing part 420 connected to the second link part 320 is folded or deployed while being rotated relative to the first wing part 410.

In this way, depending on whether or not the driving unit 200 operates, the first wing parts 410 and the second wing parts 420 may be deployed to form a propeller, or may be folded so as to cope with a fall situation or to reduce the space occupied by the propeller when the air mobility is stored.

Meanwhile, at the one end 420a of the second wing part 420, a hinge connection portion 421, to which the other end 320b of the second link part 320 is connected, protrudes. In addition, the hinge connection portion 421 is formed to match the guide slot 411 and is inserted into the guide slot 411 when the wing unit 400 is deployed.

That is, the second wing part 420 is hingedly connected to the other end 320b of the second link part 320 via the hinge connection portion 421. In particular, the hinge connection portion 421 has a protruding shape so as to be capable of being connected to the second link part 320, and has an external appearance formed to match the guide slot 411, whereby, when the first wing part 410 and the second wing part 420 are deployed, the hinge connection portion 421 is inserted into the guide slot 411 to form a support structure. Accordingly, the support performance is improved in the state in which the first wing part 410 and the second wing part 420 are deployed.

In addition, the first link part 310 and the second link part 320 are formed to match the guide slot 411, so that the first link part 310 and the second link part 320 are able to be inserted into the guide slot 411 when the wing unit 400 is deployed. Accordingly, when the first wing part 410 and the second wing part 420 are deployed, the first link part 310 and the second link part 320 are inserted into the guide slot 411, thereby forming a stable support structure. In addition, since the first link part 310 and the second link part 320 are inserted into and integrated with the guide slot 411 in the first wing part 410, the self-rigidity of the the first link part 310 and the second link part 320 is secured to reduce vibration caused due to rotation.

Meanwhile, as illustrated in FIG. 1, multiple recessed reception grooves 120 are formed in the circumferential surface of the housing 100 to match respective wing units 400, and slits 110 are formed in respective reception grooves 120.

The number of reception grooves 120 formed in the housing 100 are the same as the number of the link units 300 and the number of wing units 400, and the reception grooves 120 are formed to match respective wing units 400, so that when the wing units 400 are folded, the wing units 400 are inserted into and seated in respective reception grooves 120. Accordingly, when the wing units 400 are folded, since the amount of external protrusion of the wing units 400 is minimized because the wing units 400 are inserted into and received in respective reception grooves 120 in the housing 100, the space for storing the wing units 400 is reduced, and since the wing units 400 do not collide with the ground in a fall situation, a secondary accident due to the occurrence of fragments is avoided.

Meanwhile, the driving unit 200 is configured to operate such that the wings are folded when a signal is input thereto according to the fall of the air mobility.

That is, the driving unit 200 is operated under control of a controller, and the controller collects information such as altitude and inclination of the air mobility using various sensors provided in the air mobility so as to determine whether the air mobility is falling. As a result, when it is determined that the air mobility is falling, the controller transmits a signal related to the fall of the air mobility fall to the driving unit 200 so as to cause the driving unit 200 to operate, so that the driving unit 200 causes the wing units 400 to be folded. Due to this, it is possible to avoid accidents caused when the wing units 400 collide with the ground and fragments of the wing units 400 are scattered or when the wing units 400 rotate.

In summary, according to the propeller apparatus of the air mobility configured as described above, it is possible to prevent an accident due to scattering of fragments of the propeller when the air mobility falls and to improve space utilization when the air mobility is stored.

While the present disclosure has been illustrated and explained with respect to specific embodiments thereof, it will be obvious to a person ordinarily skilled in the art that the present disclosure can be variously modified and changed without departing from the scope of the technical idea of the present disclosure, which is defined in the accompanying claims.

What is claimed is:

1. A propeller apparatus of an air mobility, the propeller apparatus comprising:
    a housing having an inner space, wherein multiple slits are formed along a circumferential surface of the housing to extend in a vertical direction;
    a driving unit provided to move in the vertical direction in the inner space of the housing and having connection portions formed to match respective ones of the slits in the housing;
    multiple link units provided outside the housing and configured to match the respective ones of the slits in the housing, wherein the link units are rotatably connected to the connection portions, respectively, of the driving unit; and
    multiple wing units rotatably installed to the housing, connected to the link units, respectively, and configured to be rotated in a manner of being linked with the link units, which rotate when the driving unit moves up and down, thereby being folded to or deployed from the housing;
    wherein each of the link units comprises multiple link parts that are rotatably connected to each other;
    wherein each of the wing units comprises:
        multiple wing parts that are rotatably connected to respective ones of the link parts and are rotatably connected to each other, and
        a first wing part having one end rotatably connected to the housing, and a second wing part rotatably connected to another end of the first wing part, the first wing part and the second wing part being rotatably connected to the link parts of one of the link units; and
    wherein each of the link units further comprises a first link part having one end rotatably connected to one of the connection portions and another end slidably and rotatably connected to the first wing part, and a second link part having one end rotatably connected to the another end of the first link part and another end rotatably connected to the second wing part.

2. The propeller apparatus of claim 1, wherein the driving unit comprises an actuator configured to generate power, and a driving rod configured to move up and down by receiving the power from the actuator, wherein the driving rod extends such that the multiple connection portions provided along a circumference of the driving rod match the respective ones of the slits in the housing.

3. The propeller apparatus of claim 1, wherein the first wing part comprises a guide slot formed in a linear shape along a longitudinal direction of the guide slot, and the first link part comprises a guide portion formed at the another end of the first link part to be connected to the guide slot.

4. The propeller apparatus of claim 3, wherein the second wing part comprises a hinge connection portion protruding from one end of the second wing part to be connected to the another end of the second link part, and
    the hinge connection portion is formed to match the guide slot and is inserted into the guide slot when the wing units are deployed.

5. The propeller apparatus of claim 3, wherein the first link part and the second link part are formed to match the guide slot and are inserted into the guide slot when the wing units are deployed.

6. The propeller apparatus of claim 1, wherein multiple recessed reception grooves are formed in the circumferential surface of the housing to match respective wing units, and respective ones of the slits are formed in each of the reception grooves.

7. The propeller apparatus of claim 1, wherein the driving unit is configured to operate such that the wing units are folded when a signal is input thereto according to a fall of the air mobility.

* * * * *